US007853579B2

(12) United States Patent
Tsukerman et al.

(10) Patent No.: US 7,853,579 B2
(45) Date of Patent: Dec. 14, 2010

(54) METHODS, SYSTEMS AND SOFTWARE FOR IDENTIFYING AND MANAGING DATABASE WORK

(75) Inventors: Alex Tsukerman, Foster City, CA (US); Carol Lyndall Colrain, Redwood Shores, CA (US); Graham Wood, El Granada, CA (US); Jane X. Chen, Belmont, CA (US); Luxi Chidambaran, San Jose, CA (US); Benoit Dageville, Foster City, CA (US); Gary Ngai, Saratoga, CA (US); Mark Ramacher, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 11/739,277

(22) Filed: Apr. 24, 2007

(65) Prior Publication Data

US 2007/0255757 A1 Nov. 1, 2007

Related U.S. Application Data

(63) Continuation of application No. 10/946,749, filed on Sep. 21, 2004, now abandoned, and a continuation-in-part of application No. 10/917,715, filed on Aug. 12, 2004, now Pat. No. 7,664,847.

(60) Provisional application No. 60/607,054, filed on Sep. 2, 2004, provisional application No. 60/495,968, filed on Aug. 14, 2003, provisional application No. 60/500,096, filed on Sep. 3, 2003.

(51) Int. Cl.
*G06F 17/00* (2006.01)
*G06Q 30/00* (2006.01)
(52) U.S. Cl. .......................... 707/706; 705/26
(58) Field of Classification Search ................ 707/706; 705/26
See application file for complete search history.

(56) References Cited

U.S. PATENT DOCUMENTS 2,883,255 A  4/1959  Anderson (Continued)

FOREIGN PATENT DOCUMENTS

EP  0750256 A2  12/1996

(Continued)

OTHER PUBLICATIONS

Chase, Jeffrey S. et al., "Dynamic Virtual Clusters in a Grid Site Manager," Proceedings of the 12th IEEE International Symposium on High Performance Distributed Computing (HPDC'03), 2003, pp. 14 pgs.

(Continued)

*Primary Examiner*—Neveen Abel Jalil
*Assistant Examiner*—Tarek Chbouki
(74) *Attorney, Agent, or Firm*—Townsend and Townsend and Crew, LLP

(57) ABSTRACT

Various embodiments of the invention provide solutions to allow more sophisticated management of the relationship between a database and its clients (which can be, inter alia, end users, business applications, etc.). Merely by way of example, some embodiments can facilitate the management of work requests in a database, as well as the management of the quality-of-service in a database system. In some embodiments, an identification handle may be assigned to a database work request. A database management application can use the identification handle to identify the work request, as well, perhaps, as any related work requests. The identification handle may also identify the database (and/or an instance thereof) and/or a clustered database node, and the identification handle may be transmitted to a mid-tier application, e.g., to notify the mid-tier about the processing of the work request, changes in quality-of-service, server availability, etc.

37 Claims, 7 Drawing Sheets

U.S. PATENT DOCUMENTS

| | | | |
|---|---|---|---|
| 3,588,837 A | 6/1971 | Rash et al. | |
| 5,311,194 A | 5/1994 | Brown et al. | |
| 5,345,245 A | 9/1994 | Ishikawa et al. | |
| 5,548,539 A | 8/1996 | Vlach et al. | |
| 5,600,791 A | 2/1997 | Carlson et al. | |
| 5,721,825 A | 2/1998 | Lawson et al. | |
| 5,774,668 A | 6/1998 | Choquier et al. | |
| 5,890,167 A | 3/1999 | Bridge, Jr. et al. | |
| 5,918,059 A | 6/1999 | Tavallaei et al. | |
| 5,933,604 A | 8/1999 | Inakoshi | |
| 5,951,694 A | 9/1999 | Choquier et al. | |
| 5,995,815 A | 11/1999 | Blom et al. | |
| 6,041,357 A | 3/2000 | Kunzelman et al. | |
| 6,061,678 A * | 5/2000 | Klein et al. | 707/3 |
| 6,088,727 A | 7/2000 | Hosokawa et al. | |
| 6,088,728 A | 7/2000 | Bellemore et al. | |
| 6,105,067 A | 8/2000 | Batra | |
| 6,112,196 A | 8/2000 | Zimowski et al. | |
| 6,178,529 B1 | 1/2001 | Short et al. | |
| 6,192,401 B1 | 2/2001 | Modiri et al. | |
| 6,243,718 B1 * | 6/2001 | Klein et al. | 707/203 |
| 6,243,751 B1 | 6/2001 | Chatterjee et al. | |
| 6,266,666 B1 * | 7/2001 | Ireland et al. | 707/10 |
| 6,279,001 B1 | 8/2001 | DeBettencourt et al. | |
| 6,304,967 B1 * | 10/2001 | Braddy | 713/150 |
| 6,321,235 B1 * | 11/2001 | Bird | 707/203 |
| 6,327,622 B1 | 12/2001 | Jindal et al. | |
| 6,353,898 B1 | 3/2002 | Wipfel et al. | |
| 6,415,333 B1 | 7/2002 | Vasell | |
| 6,433,739 B1 | 8/2002 | Soliman | |
| 6,438,705 B1 | 8/2002 | Chao et al. | |
| 6,453,314 B1 * | 9/2002 | Chan et al. | 707/3 |
| 6,466,949 B2 | 10/2002 | Yang et al. | |
| 6,556,659 B1 | 4/2003 | Bowman-Amuah | |
| 6,587,866 B1 | 7/2003 | Modi et al. | |
| 6,594,786 B1 | 7/2003 | Connelly et al. | |
| 6,601,101 B1 | 7/2003 | Lee et al. | |
| 6,718,394 B2 | 4/2004 | Cain | |
| 6,728,748 B1 | 4/2004 | Mangipudi et al. | |
| 6,732,063 B2 | 5/2004 | Famili et al. | |
| 6,738,790 B1 * | 5/2004 | Klein et al. | 707/203 |
| 6,738,933 B2 | 5/2004 | Fraenkel et al. | |
| 6,801,949 B1 | 10/2004 | Bruck et al. | |
| 6,816,907 B1 | 11/2004 | Mei et al. | |
| 6,925,477 B1 | 8/2005 | Champagne et al. | |
| 6,950,822 B1 | 9/2005 | Idicula et al. | |
| 6,950,848 B1 * | 9/2005 | Yousefi'zadeh | 709/203 |
| 6,952,766 B2 | 10/2005 | Dervin et al. | |
| 6,954,737 B2 | 10/2005 | Kalantar et al. | |
| 6,978,366 B1 * | 12/2005 | Ignatchenko et al. | 713/166 |
| 6,990,606 B2 | 1/2006 | Schroiff et al. | |
| 7,024,394 B1 | 4/2006 | Ashour et al. | |
| 7,039,654 B1 | 5/2006 | Eder | |
| 7,058,957 B1 | 6/2006 | Nguyen | |
| 7,069,309 B1 | 6/2006 | Dodrill et al. | |
| 7,082,117 B2 | 7/2006 | Billhartz | |
| 7,093,250 B1 | 8/2006 | Rector | |
| 7,136,825 B2 | 11/2006 | Araki et al. | |
| 7,174,379 B2 | 2/2007 | Agarwal et al. | |
| 7,177,823 B2 | 2/2007 | Lam et al. | |
| 7,178,050 B2 | 2/2007 | Fung et al. | |
| 7,263,590 B1 | 8/2007 | Todd et al. | |
| 7,269,157 B2 | 9/2007 | Klinker et al. | |
| 7,272,688 B1 | 9/2007 | Glasco | |
| 7,292,961 B2 | 11/2007 | Dias et al. | |
| 7,293,255 B2 | 11/2007 | Kumar | |
| 7,296,268 B2 | 11/2007 | Darling et al. | |
| 7,299,294 B1 | 11/2007 | Bruck et al. | |
| 7,346,744 B1 | 3/2008 | Glasco | |
| 7,349,980 B1 * | 3/2008 | Darugar et al. | 709/238 |
| 7,370,223 B2 | 5/2008 | Olmstead et al. | |
| 7,392,421 B1 | 6/2008 | Bloomstein et al. | |
| 7,395,187 B2 | 7/2008 | Duvanovich et al. | |
| 7,401,143 B2 * | 7/2008 | Oulu et al. | 709/224 |
| 7,406,631 B2 | 7/2008 | Moore | |
| 7,437,446 B2 | 10/2008 | Bailey et al. | |
| 7,447,693 B2 * | 11/2008 | Wilding et al. | 707/100 |
| 7,506,034 B2 * | 3/2009 | Coates et al. | 709/219 |
| 7,512,686 B2 * | 3/2009 | Berg | 709/227 |
| 2001/0027406 A1 | 10/2001 | Araki et al. | |
| 2001/0056493 A1 | 12/2001 | Mineo | |
| 2002/0055982 A1 | 5/2002 | Goddard | |
| 2002/0073139 A1 | 6/2002 | Hawkins et al. | |
| 2002/0073354 A1 | 6/2002 | Schroiff et al. | |
| 2002/0078263 A1 | 6/2002 | Darling et al. | |
| 2002/0099598 A1 | 7/2002 | Eicher et al. | |
| 2002/0129146 A1 | 9/2002 | Aronoff et al. | |
| 2002/0129157 A1 | 9/2002 | Varsano | |
| 2002/0161896 A1 | 10/2002 | Wen et al. | |
| 2002/0194015 A1 | 12/2002 | Gordon et al. | |
| 2002/0198883 A1 | 12/2002 | Nishizawa et al. | |
| 2002/0198984 A1 | 12/2002 | Goldstein et al. | |
| 2002/0198985 A1 | 12/2002 | Fraenkel et al. | |
| 2003/0005028 A1 | 1/2003 | Dritschler et al. | |
| 2003/0007497 A1 | 1/2003 | March et al. | |
| 2003/0037146 A1 | 2/2003 | O'Neill | |
| 2003/0039212 A1 | 2/2003 | Lloyd et al. | |
| 2003/0040282 A1 | 2/2003 | Park | |
| 2003/0046298 A1 * | 3/2003 | Weedon | 707/102 |
| 2003/0063122 A1 | 4/2003 | Cichowlas et al. | |
| 2003/0065986 A1 | 4/2003 | Fraenkel et al. | |
| 2003/0074475 A1 * | 4/2003 | Ollikainen | 709/246 |
| 2003/0088425 A1 | 5/2003 | Lam et al. | |
| 2003/0088671 A1 | 5/2003 | Klinker et al. | |
| 2003/0105863 A1 | 6/2003 | Hegli et al. | |
| 2003/0108052 A1 | 6/2003 | Inoue et al. | |
| 2003/0120710 A1 * | 6/2003 | Pulsipher et al. | 709/106 |
| 2003/0126240 A1 | 7/2003 | Vosseler | |
| 2003/0135609 A1 | 7/2003 | Carlson et al. | |
| 2003/0135642 A1 | 7/2003 | Benedetto et al. | |
| 2003/0149550 A1 | 8/2003 | Famili et al. | |
| 2003/0154398 A1 | 8/2003 | Eaton et al. | |
| 2003/0158951 A1 | 8/2003 | Primak et al. | |
| 2003/0167456 A1 * | 9/2003 | Sabharwal | 717/108 |
| 2003/0172145 A1 | 9/2003 | Nguyen | |
| 2003/0204509 A1 | 10/2003 | Dinker et al. | |
| 2003/0208523 A1 | 11/2003 | Gopalan et al. | |
| 2003/0229695 A1 | 12/2003 | McBride | |
| 2004/0024881 A1 | 2/2004 | Elving et al. | |
| 2004/0064548 A1 | 4/2004 | Adams et al. | |
| 2004/0078455 A1 | 4/2004 | Eide et al. | |
| 2004/0078602 A1 | 4/2004 | Rothbarth et al. | |
| 2004/0098490 A1 | 5/2004 | Dinker et al. | |
| 2004/0103195 A1 | 5/2004 | Chalasani et al. | |
| 2004/0111506 A1 | 6/2004 | Kundu et al. | |
| 2004/0117375 A1 | 6/2004 | Saha et al. | |
| 2004/0117794 A1 | 6/2004 | Kundu | |
| 2004/0153708 A1 | 8/2004 | Joshi et al. | |
| 2004/0176996 A1 | 9/2004 | Powers et al. | |
| 2004/0205101 A1 | 10/2004 | Radhakrishnan | |
| 2004/0243699 A1 | 12/2004 | Koclanes et al. | |
| 2004/0249838 A1 | 12/2004 | Hinshaw et al. | |
| 2004/0257985 A1 | 12/2004 | Sahai et al. | |
| 2004/0268357 A1 | 12/2004 | Joy et al. | |
| 2005/0021771 A1 | 1/2005 | Kaehn et al. | |
| 2005/0027858 A1 | 2/2005 | Sloth et al. | |
| 2005/0038800 A1 | 2/2005 | Chidambaran et al. | |
| 2005/0038833 A1 | 2/2005 | Colrain et al. | |
| 2005/0050116 A1 | 3/2005 | Gross et al. | |
| 2005/0055383 A1 | 3/2005 | Dias et al. | |
| 2005/0086242 A1 | 4/2005 | Ngai et al. | |
| 2005/0086263 A1 | 4/2005 | Ngai et al. | |
| 2005/0120111 A1 | 6/2005 | Bailey et al. | |
| 2005/0131900 A1 | 6/2005 | Palliyll et al. | |

| | | | |
|---|---|---|---|
| 2005/0132222 | A1 | 6/2005 | Petrovic |
| 2005/0165925 | A1 | 7/2005 | Dan et al. |
| 2005/0172288 | A1 | 8/2005 | Ahuja et al. |
| 2005/0239476 | A1 | 10/2005 | Betrabet et al. |
| 2005/0251792 | A1 | 11/2005 | Smith |
| 2005/0267965 | A1 | 12/2005 | Heller |
| 2006/0036617 | A1 | 2/2006 | Bastawala et al. |
| 2006/0059170 | A1 | 3/2006 | Dias et al. |
| 2006/0161816 | A1 | 7/2006 | Gula et al. |
| 2006/0195525 | A1 | 8/2006 | Page et al. |
| 2007/0226323 | A1 | 9/2007 | Halpern |
| 2008/0027769 | A1 | 1/2008 | Eder |
| 2008/0209027 | A1 | 8/2008 | Duyanovich et al. |

FOREIGN PATENT DOCUMENTS

| | | |
|---|---|---|
| EP | 0942363 A2 | 9/1999 |
| EP | 0992909 A2 | 4/2000 |
| EP | 1054265 A | 11/2000 |
| EP | 1061661 A | 12/2000 |
| EP | 1152254 A | 11/2001 |
| EP | 1170662 A2 | 1/2002 |
| EP | 1260902 A2 | 11/2002 |
| JP | 10-187638 A | 7/1998 |
| WO | WO 97-14056 A | 4/1997 |
| WO | WO 00-10084 A | 2/2000 |
| WO | WO 02-05116 A2 | 1/2002 |
| WO | WO 02-07037 A1 | 1/2002 |
| WO | WO 02-097676 A2 | 12/2002 |
| WO | WO 03-014928 A2 | 2/2003 |
| WO | WO 03-014929 A1 | 2/2003 |
| WO | WO 03-048934 A2 | 6/2003 |
| WO | WO 03-062983 A | 7/2003 |

OTHER PUBLICATIONS

Kokku, Ravi et al., "Half-pipe Anchoring: An Efficient Technique for Multiple Connection Handoff," Proceedings 10th International Conference on Network Protocols, Nov. 12, 2002, XP010632563, 10 pages.

Lin, Ying-Dar et al., "Direct Web Switch Routing with State Migration, TCP Masquerade, and Cookie Name Rewriting," IEEE Global Telecommunications Conference, Department of Computer and Information Science, National Chiao Tung Univerisity, Hsinchu, Taiwan, Globecom 2003, Dec. 1, 2003, CP010677300, pp. 3663-3667.

Skow, Eric et al., "A Security Architecture for Application Session Handoff," IEEE International Conference Proceedings, Department of Computer Science, The University of California at Los Angeles, http://pcl.cs.ucla.edu/projects/imash, Apr. 28-May 2, 2002, vol. 1 of 5, XP010589848, 6 pgs.

Song, Henry et al., "Browser State Repository Service," DoCoMo Communications Laboratories, Inc., Lecture Notes in Computer Science, vol. 2414, 2002, XP002904339, 12 pgs.

PCT/US04/25805, filed Aug. 9, 2004, International Preliminary Report on Patentability, International Search Report with Written Opinion dated Nov. 18, 2005 and International Search Report dated Dec. 3, 2004, 23 pgs.

PCT/US04/26506, filed Aug. 13, 2004, International Preliminary Report on Patentability with Written Opinion dated Mar. 3, 2006 and International Search Report dated Sep. 8, 2005, 23 pgs.

PCT/US04/26405, filed Aug. 13, 2004, International Preliminary Report on Patentability with Written Opinion dated Oct. 10, 2006 and International Search Report dated Jan. 6, 2006, 19 pgs.

PCT/US04/26570, filed Aug. 13, 2004, International Preliminary Report on Patentability with Written Opinion dated Aug. 26, 2005 and International Search Report dated Nov. 25, 2004, 18 pgs.

PCT/US04/26445, filed Aug. 13, 2004, International Preliminary Report on Patentability with Written Opinion dated Dec. 12, 2005 and International Search Report dated Aug. 25, 2005, 17 pgs.

PCT/US04/26389, filed Aug. 13, 2004, International Preliminary Report on Patentability with Written Opinion dated Feb. 20, 2006 and International Search Report dated Aug. 4, 2005, 24 pgs.

PCT/US05/25887, filed Jul. 20, 2005, International Preliminary Report on Patentability with Written Opinion dated Feb. 13, 2007 and International Search Report dated Feb. 6, 2006, 10 pgs.

U.S. Appl. No. 10/917,715, filed Aug. 12, 2004, Notice of Allowance dated Oct. 9, 2009, 18 pages.

U.S. Appl. No. 10/917,715, filed Aug. 12, 2004, Miscellaneous Action with SSP dated Oct. 2, 2009, 4 pages.

U.S. Appl. No. 10/917,715 filed Aug. 12, 2004, Final Rejection dated May 29, 2009, 17 pages.

U.S. Appl. No. 10/917,715, filed Aug. 12, 2004, Non-Final Rejection dated Jan. 5, 2009, 17 pages.

U.S. Appl. No. 10/917,715, filed Aug. 12, 2004, Adivsory Action dated Nov. 14, 2008, 4 pages.

U.S. Appl. No. 10/917,715, filed Aug. 12, 2004, Final Rejection dated Sep. 3, 2008, 20 pages.

U.S. Appl. No. 10/917,715, filed Aug. 12, 2004, Non-Final Rejection dated Apr. 14, 2008, 48 pages.

U.S. Appl. No. 10/946,749, filed Sep. 21, 2004, Non-Final Rejection dated Jan. 24, 2007, 25 pages.

\* cited by examiner

METHODS, SYSTEMS AND SOFTWARE FOR IDENTIFYING AND MANAGING DATABASE WORK

CROSS-REFERENCE TO RELATED APPLICATIONS

This application is a continuation of U.S. patent application Ser. No. 10/946,749, filed Sep. 21, 2004 by Tsukerman et al. and entitled "METHODS, SYSTEMS AND SOFTWARE FOR IDENTIFYING AND MANAGING DATABASE WORK," (the entire disclosure of which is incorporated herein by reference), which is a nonprovisional of, and claims the benefit of, provisional U.S. patent application Ser. No. 60/607,054 filed Sep. 2, 2004 by Tsukerman et al. and entitled "METHODS, SYSTEMS AND SOFTWARE FOR IDENTIFYING AND MANAGING DATABASE WORK," the entire disclosure of which is incorporated herein by reference.

This application is also a continuation in part of U.S. patent application Ser. No. 10/917,715, filed Aug. 12, 2004 by Colrain et al. and entitled "MANAGING WORKLOAD BY SERVICE," (the entire disclosure of which is incorporated herein by reference), which is a nonprovisional of, and claims the benefit of, provisional U.S. patent application Ser. No. 60/495,368, filed Aug. 14, 2003 by Chatterjee et al. and entitled "COMPUTER RESOURCE PROVISIONING," (the entire disclosure of which is incorporated herein by reference) and provisional U.S. patent application Ser. No. 60/500,096, filed Sept. 3, 2003 by Colrain et al. and entitled "SERVICE BASED WORKLOAD AND MEASUREMENT IN A DISTRIBUTED SYSTEM," the entire disclosure of which is incorporated herein by reference.

BACKGROUND

The present invention relates to generally computer systems, and particularly to computer database management systems.

As computing becomes ever more pervasive in modern society, the importance of databases, and tools for managing databases, continues to increase. Once used merely to store large amounts of data, modern databases now form the backbone of many, if not most, sophisticated enterprise applications. Merely by way of example, enterprise-class database systems, such as Oracle Corp.'s Oracle 10 g™ relational database management system ("RDBMS"), provide the back-end for virtually all enterprise resource planning ("ERP") and customer relationship management ("CRM") software applications, as well as many e-commerce applications, Internet web sites and the like.

As the applications for databases have expanded, so have the methods and tools for interacting with those databases. In the past, a proprietary client application would be used to open a dedicated "session" with an RDBMS (and/or an instance thereof) to interact with the database. Through this dedicated session, the client application could access, modify and/or add to data in the database. It was not always easy, however, to identify the client or its such interactions with the database. In some cases, such arrangements provided the ability to trace structured query language ("SQL") requests made during a particular session, measure the resources consumed by a particular session, etc. First, however, the session generally needed to be identified from all others.

Now, however, a variety of different methods are used to interact with a database. Merely by way of example, a database user might interact with a database (and/or an associated RDBMS) via a web browser instead of with a client application. In other circumstances, a database might be used to power a business application. In such cases, the end user may never interact with the database itself, but instead might make requests of the business application (through a dedicated client of the business application, a web browser, etc.), which might cause the business application to interact with the database.

Now, in order to provide enhanced scalability, responsiveness and/or reliability, many companies choose to operate databases in a clustered environment. In such an environment (and in other cases as well), the RDBMS might be configured to provide "connection pooling," where each client transaction (whether from a business application or directly from an end user) may be managed by the cluster and allocated to an appropriate node and/or instance of the database and/or server (depending, for example, on relative transaction costs, relative loads on each node at the time of the transaction, etc.). Under these circumstances, therefore two transactions with the same client might be handled by two different nodes/instances. Such concepts have been in use on mainframes for some time and are now gaining popularity in clustered database environments.

While these advanced modes of interaction with databases unquestionably provide many benefits unavailable in the dedicated client-server architecture, they also increase the difficulty of managing the relationship between the database and its clients or users. Merely by way of example, if a user accesses a database through a web browser instead of a dedicated client, it may be difficult to implement the concept of a persistent "session," since each transaction between the web browser and the database essentially opens a new session and/or uses one of a pool of open sessions. Moreover, if an end user uses a database only through a business application, it may be difficult for a database administrator to determine which transactions between the database and the business application relate to that user's interaction with the business application, which can, for example, make it problematic to troubleshoot any persistent problems (such as performance issues, etc.) experienced by that user. The same circumstances make it difficult to trace transactions associated with a particular client or business function from a business application or to collect any meaningful statistics about such transactions.

It would be useful, therefore, to provide a way for an RDBMS (and/or an administrator) to identify transactions in a more sophisticated manner.

SUMMARY

Various embodiments of the invention provide solutions to allow more sophisticated management of the relationship between a database and its clients (which can be, inter alia, end users, business applications, etc.). Merely by way of example, some embodiments provide methods, systems and/or software products that can facilitate the management of work requests in a database. In some embodiments, an identification handle can be assigned to a particular database work request, and the request, perhaps with the identifier, may be transmitted to a database management application. The database management application can receive the work request and/or the identifier, and thereafter can use the identifier to identify the work request, as well, perhaps, as any future work requests that might be related to the work request. In particular embodiments, the database management application can add additional information to an identification handle (such as, merely by way of example, a unique database name, a cluster node name, an instance name, etc.) and/or create a new identification handle for that information. In some cases, the database management application can return the modified handle (and/or the new handle) to a client and/or a mid-tier application, e.g., to allow the client/mid-tier application to identify and/or route related work requests. Hence, a work request may be identified, and/or a plurality of work requests can be correlated. Likewise, related work requests may be traced, statistics may be collected about related work requests, etc.

Merely by way of example, one set of embodiments provides methods of identifying a database work request. One such method comprises assigning an identification handle to a database work request. The identification handle may comprise sufficient information to identify an entity associated with the database work request and/or a database, instance, node, etc. that may be assigned the work request. The method may further comprise receiving at a database management application the work request together with the identification handle assigned to the work request. The database management application may manage a database to which the work request corresponds. In some embodiments, the method further comprises generating a hash value associated with the identification handle assigned to the work request and/or storing the hash value associated with the identification handle. In a particular set of embodiments, there may be multiple hash values associated with an identification handle (e.g., a hash value for a service, a hash value for a module, a hash value for an action, a hash value for a client identifier, etc.). In some cases, the method may be repeated for a plurality of work requests, and/or the plurality of work requests may be correlated.

Other sets of embodiments can provide systems and/or computer program products, which may be configured and/or executable to perform methods of the invention. One exemplary system can have a first computer, which may comprise a processor and/or a computer readable medium. The computer readable medium may comprise instructions executable by the processor to assign an identification handle to a database work request; the identification handle may comprise sufficient information to identify an entity associated with the database work request. Some systems may also have a second computer, which also may comprise a processor and a computer readable medium in communication with the processor. The computer readable medium can comprise a database management application executable by the processor, a database managed by the database management application, and/or instructions executable by the processor. The instructions may be executable to receive at the database management application the work request together with the identification handle assigned to the work request; the work request may correspond to the database managed by the database management application. The instructions may be further executable to generate one or more hash value(s) associated with the identification handle assigned to the work request and/or store the hash value(s) associated with the identification handle.

Another exemplary system may comprise a computer with a processor and a computer readable medium in communication with the processor. The computer readable medium can comprise a database management application executable by the processor, a database managed by the database management application, and/or instructions executable by the processor to receive at the database management application a work request together with an identification handle assigned to the work request, generate a hash value associated with the identification handle assigned to the work request, and/or store the hash value associated with the identification handle.

In some embodiments, the work request may correspond to and/or be assigned to the database managed by the database management application. In other embodiments, the identification handle may comprise sufficient information to identify an entity associated with the database work request.

Further embodiments of the invention include computer programs, including programs embodied on a computer-readable medium, that can be executable (e.g. by a computer and/or system to perform various methods of the invention, including without limitation, those described above.

The invention has been briefly summarized above. A further understanding of specific details and features of the invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION

1. General Overview

Figure 1A:
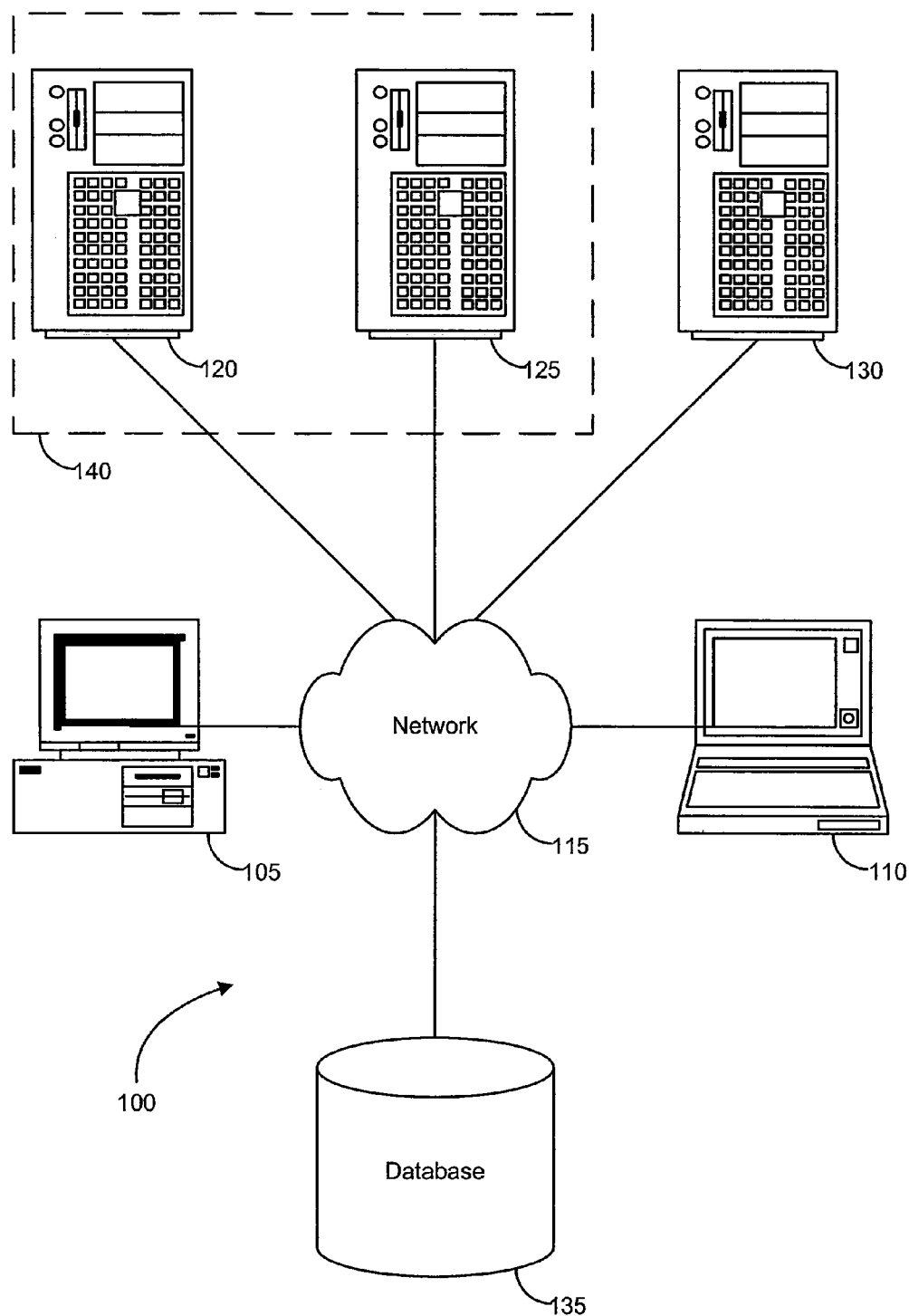
FIG. 1A is an architectural diagram of an exemplary computer network system that can be used to manage database work requests in accordance with certain embodiments of the invention.

Various embodiments of the invention provide solutions to allow more sophisticated management of the relationship between a database and its clients (which can be, inter alia, end users, business applications, etc.). Merely by way of example, some embodiments provide methods, systems and/or software products that can facilitate the management of work requests in a database. In some embodiments, an identification handle can be assigned to a particular database work request, and the request, perhaps with the identifier, may be transmitted to a database management application. The database management application can receive the work request and/or the identifier, and thereafter can use the identifier to identify the work request, as well, perhaps, as any future work requests that might be related to the work request. In particular embodiments, the database management application can add additional information to an identification handle (such as, merely by way of example, a unique database name, a cluster node name, an instance name, etc.) and/or create a new identification handle for that information. In some cases, the database management application can return the modified handle (and/or the new handle) to a client and/or a mid-tier application, e.g., to allow the client/mid-tier application to identify and/or route related work requests. In this way, for example, the client and/or mid-tier application may know the location of a work request, such that if a database server fails, the client and/or mid-tier application may cancel the work request, re-route the work request, etc. Hence, a work request may be identified, and/or a plurality of work requests can be correlated. Likewise, related work requests may be traced, statistics may be collected about related work requests, etc.

As used herein, the term "database work request" (or merely "work request" as a shorthand reference) means any interaction between an entity and a database. Such entities can include a "middle tier application" (or merely "mid-tier application" as a shorthand reference). A mid-tier application can be any software application that interacts with a database or an RDBMS (e.g., via work requests). Examples of mid-tier applications can include without limitation, business applications such as ERP and/or CRM packages (including, merely by way of example, those available from SAP A.G.™, Peoplesoft Corp.™, Oracle Corp., and the like), web server applications, such as the Apache open source web server, as one example and/or the like. Such entities can also include a "client," which as used herein, means any software application allowing an end user to interact with a database, mid-tier application, etc. Examples of clients can include web browsers (which may interact with a mid-tier application, such as a web server and/or business application, and/or directly with an RDBMS), dedicated client applications (such as clients for business applications and or RDBMS applications), and/or the like. In some cases, a client may run on an end-user's PC. Other entities are possible as well.

A work request, therefore, may be created by, inter alia, a client, a mid-tier application and/or a combination of each. Merely by way of example, a client may engage in a transaction (e.g., a SQL command) directly with an RDBMS (in this example, there may be no mid-tier application, or the system may be configured to allow the client to bypass the mid-tier application and access the RDBMS directly). Alternatively, the client may interact with a mid-tier application, and that interaction may cause the mid-tier application to engage in a transaction with an RDBMS. In yet further embodiments, a mid-tier application may engage in a transaction with an RDBMS, not as the result of any particular client interaction, but perhaps as part of a scheduled update or maintenance process, merely by way of example.

For ease of description, a work request that is transmitted by a client is referred to as a "client request," while a work request that is transmitted by a mid-tier application is referred to as a "service request." In some cases, a client request may be transmitted to a mid-tier application, where it may (or may not) be modified and/or transmitted to the RDBMS. Such requests may also be considered service requests, since, from the perspective of the RDBMS, they are received from the mid-tier application. The term "work request" is intended to include these, as well as other, types of work requests. Those skilled in the art will appreciate, based on the disclosure herein, that various other types of work requests may be implemented in accordance with embodiments of the invention.

In accordance with various embodiments, an identification handle may be assigned to a work request. Depending on the embodiment, the identification handle may include a variety of different types of information. Merely by way of example, in some cases, an identification handle may include information that allows for the unique identification of the client from which the request originated. If the client is a web browser, for example, a browser cookie (which is well-known in the art and will not be described in detail herein) may be set for the browser. The cookie might comprise an identifier (which can be unique), and/or the identifier might be used as part (or all) of the identification handle. Thereafter, each work request from that browser (or, in specific embodiments, each work request associated with a particular application function, session, etc.) may include the same identifier in the identification handle assigned to that work request. In other cases, the end user might be required to login to the RDBMS and/or a mid-tier application, and an identification handle might comprise some or all of the user's login information (e.g., a userid).

As noted above (and described in detail below), certain embodiments might feature a mid-tier application. In such cases, the mid-tier application might comprise one or more services, modules and/or actions. In some embodiments, a service can be considered to comprise a group of related business functions. The client, therefore, might select a particular service offered by the mid-tier application as part of a connection request. Merely by way of example, services offered by a mid-tier application can include a payroll service, an order processing service, etc. A module can correspond to a specific program module, script, form, etc. that an end user/client may be using in a mid-tier application, such as, for example an order-entry module within the order processing service, etc. An action can correspond to a particular action that an end user/client may be performing within a mid-tier application, which may (or may not) trigger a database transaction. The concepts of service, module and action, therefore, can be incorporated into an identification handle if desired. Merely by way of example, an identification handle can comprise an identifier for a service, module, action, and/or any combination thereof.

In a particular set of embodiments, a client may be assigned to a service based on the client's credentials. Merely by way of example, a client may receive premium or standard service (or for that matter, one or more of a variety of service levels), for a particular application (such as a mid-tier application. The service level might be assigned by the mid-tier application.

In further embodiments, an identification handle can include a name for the database to which the work request corresponds (in many cases, this name will be capable of uniquely identifying a database), an identifier indicating which instance of the database (e.g., in a clustered and/or multi-instance implementation) and/or which node of a cluster is servicing a work request. Such information may be added to an identification handle by the RDBMS (and/or any clusterware supporting the clustered environment). In some cases, a work request might be associated with a plurality of identification handles (e.g., a client identification handle, a service identification handle, a service/module/action identification handle, etc.). In other cases, a work request might be associated with a single identification handle comprising some or all of this information (as well, perhaps, as a database communication identifier, such as a cluster node name, an instance name, a unique database name, etc.). A variety of different combinations of identifiers may be used in various embodiments. Based on the disclosure herein, those skilled in the art will appreciate that some of this information can be generally applicable to any database system, while other information (such as an instance name or a cluster node name) may be more specifically applicable to clustered systems.

As described in more detail below, the identification handle for a particular work request may be used to identify the work request, correlate related work requests, and/or provide tracing and/or statistics for a set of related work requests. Based on the information in a given identification handle, work requests can be correlated according to the client (and/or end user) making the request, by the mid-tier service, action and/or module the request relates to, etc.

2. Exemplary Embodiments

Some embodiments of the invention, including those described generally above, may be performed in a computer system. FIG. 1A illustrates a block diagram of an exemplary system 100 depicting some such embodiments. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA™, IPX™, AppleTalk™, and the like. Merely by way of example, the network 115 maybe a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running a mid-tier application, such as a business application, a web server, etc. Such servers may be used to process requests (including client work requests) from user computers 105, 110. The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The server(s) may also include database servers, including without limitation those commercially available from Oracle™, Microsoft™, Sybase™, IBM™ and the like, which can process requests from database clients running on a user computer 105, 110.

In some embodiments, a mid-tier application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to a mid-tier application and/or a database server. Those skilled in the art will recognize that the functions described with respect to various types of servers may be performed by a single server and/or a plurality of specialized servers, depending on implementation-specific needs and parameters.

In accordance with some embodiments, one or more servers (e.g., 120, 125) may be database servers and/or may be configured to operate in a clustered environment (as indicated by the broken line 140 of FIG. 1). As defined herein, a cluster of computers can include one or more computers that are configured to operate in coordinated fashion, e.g., by providing parallel processing of instructions, responding to job requests cooperatively, maintaining multiple instances of an application and/or a database, and/or the like. In particular embodiments, a cluster may be configured to provide many database services, and/or each member ("node") of a cluster may be configured to operate an RDBMS (such as Oracle 10 g™), which may be a cluster-aware. Optionally, each server 120, 125 can have a separate instance of a database managed by that database management program. The cluster, therefore, can provide database services on a scalable, high-availability basis familiar to those skilled in the art. Each of the servers 120, 125 may also include one or more "clusterware" programs familiar to those skilled in the art. One example of a clusterware program that may be employed in various embodiments is Oracle's Cluster Ready Services™ ("CRS"). In some cases, a particular server may be configured to run both an RDBMS and one or more mid-tier applications. In other cases, a service may execute on one or many instances of the cluster.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g™, that is adapted to store, update, and retrieve data in response to SQL-formatted commands.

In particular embodiments, each database server 120, 125 (and/or each cluster node) may include its own database (which is shown on FIG. 1A, for ease of illustration, as a single database 135), which may be stored local to that server, on a network (including a SAN), etc. In some of these embodiments, each server's database may be an instance of a common, clustered database, an arrangement familiar to those skilled in the art. In other embodiments, each database server 120, 125 may be configured to access a common instance of the database 135.

Figure 1B:
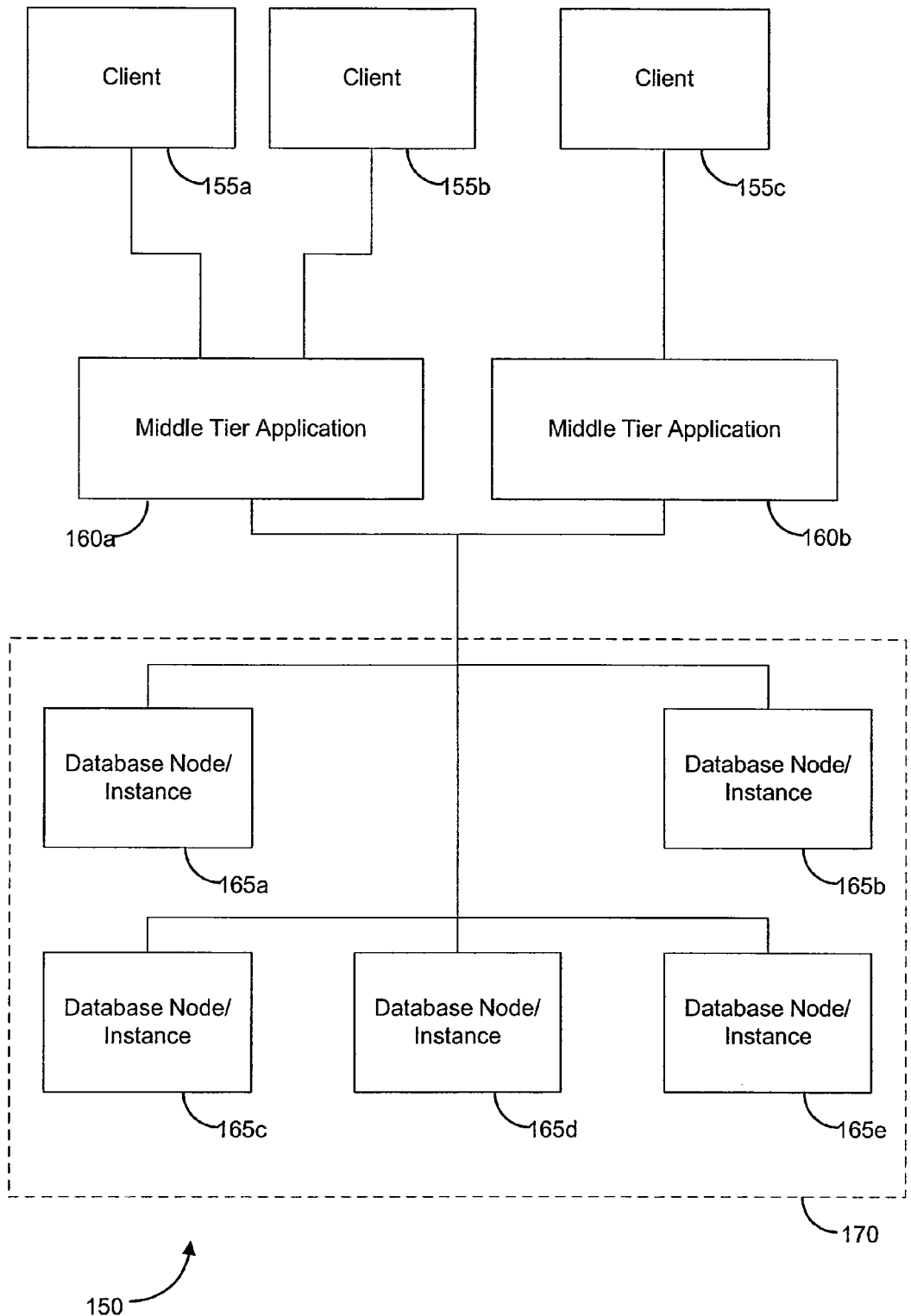
FIG. 1B is a block diagram of a multi-tiered database system that can be used to manage database work requests in accordance with certain embodiments of the invention.

FIG. 1B illustrates a block diagram of a multi-tiered system 150, depicting a relationship between various system components that may be typical of some embodiments. The system 150 may include one or more clients 155 (such as, for example, the clients described above), which may be running on an end user computer. Each of the clients may be in communication with one or more mid-tier applications 160, which, in turn, may be in communication with a database 165 (in some cases, this communication may be mediated by an RDBMS). In various embodiments, as described above, the database 165 may comprise a plurality of instances (e.g., 165a-e). In particular embodiments, each of the instances may be part of a cluster arrangement (denoted by the box 170). Thus, the system 150 may include a session and/or connection pooling scheme, whereby a client and/or mid-tier application simply submits a work request to a set of pooled sessions/connections, and the RDBMS allocates the work request based on node/instance availability, load balancing considerations, etc. In some cases, as described in more detail below, an identification handle may allow for work requests to be tracked even in the absence of a dedicated connection/session between a mid-tier application and/or service (or for that matter, a client) and a particular database and/or database instance.

Figure 1C:
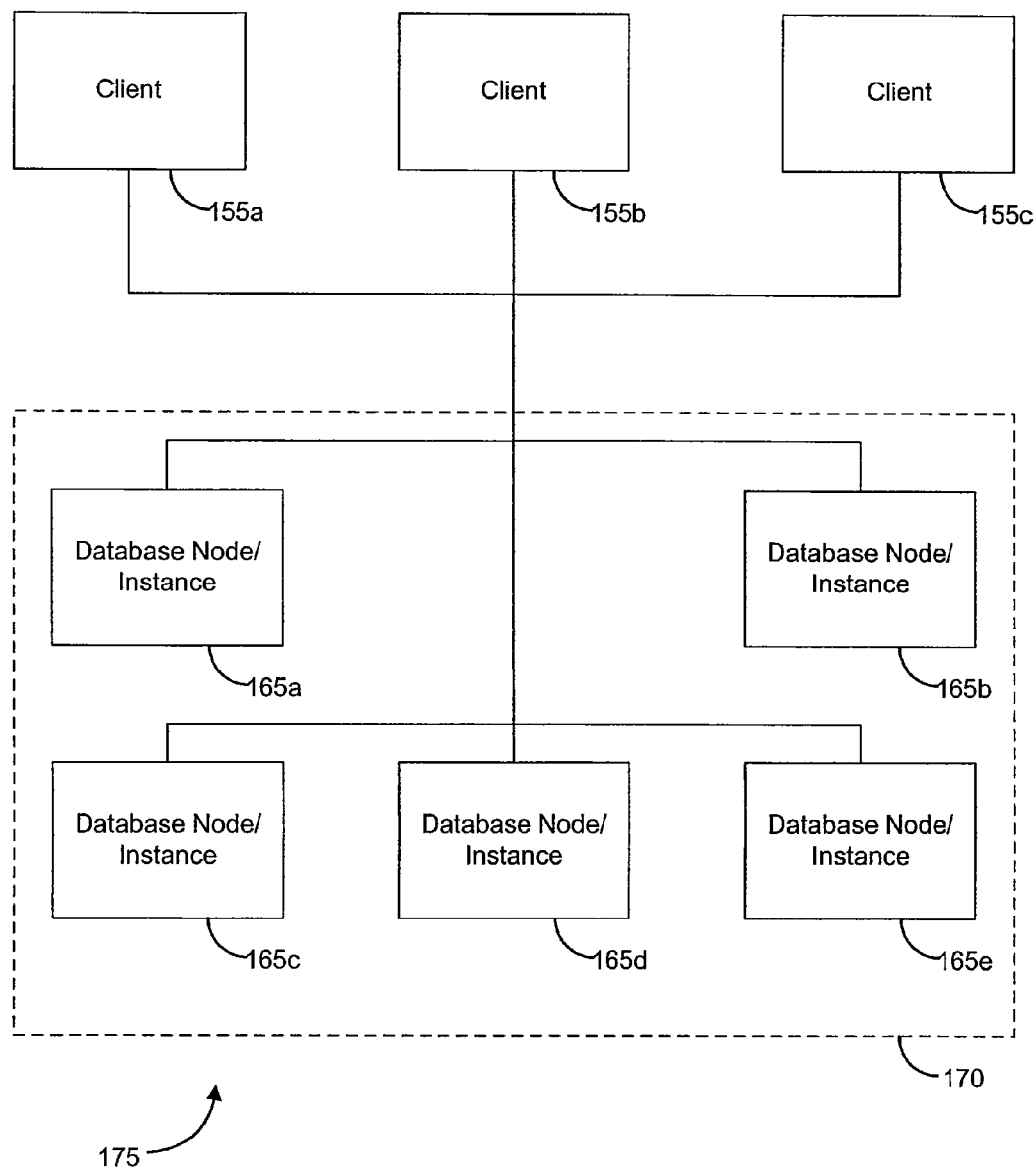
FIG. 1C is a block diagram of an alternative database system that can be used to manage database work requests in accordance with certain embodiments of the invention.

In other embodiments, some examples of which are depicted by the system 175 of FIG. 1C, one or more of the clients 155 may be in direct communication with the database 165 (and/or specific instances thereof). In some such embodiments, there may be no mid-tier application. In other embodiments, there may be a mid-tier application, and/or the system 175 may still be configured to allow a client 155 to access a database service directly.

Figure 2:
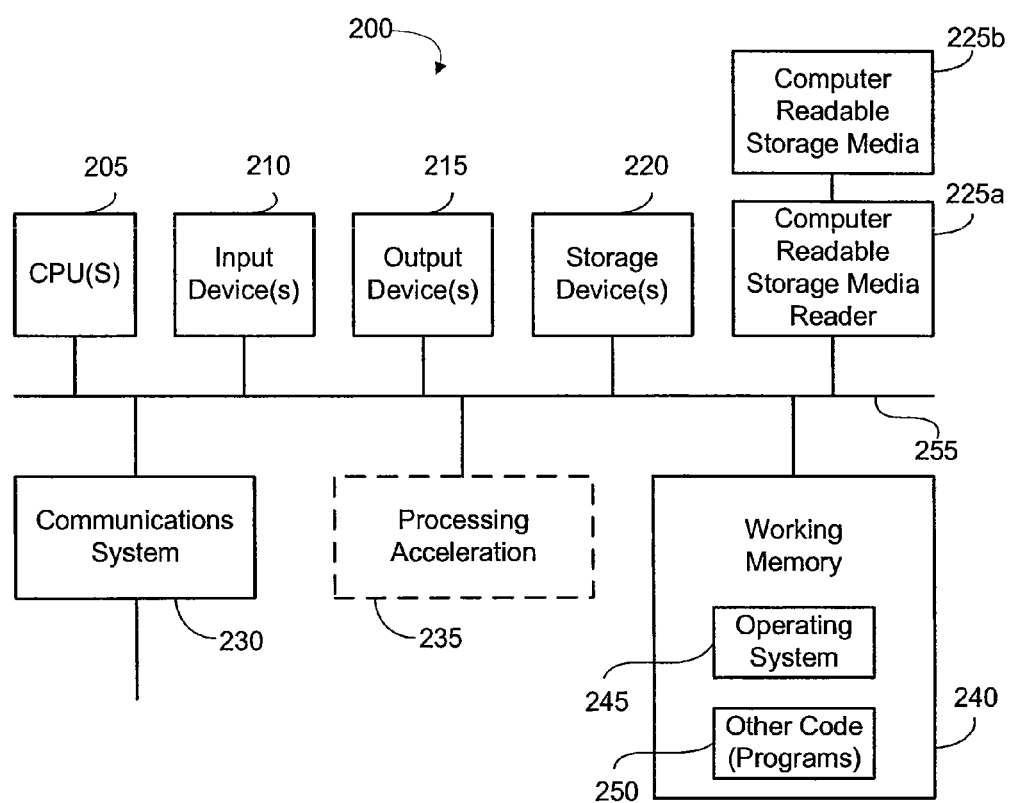
FIG. 2 is a generalized illustration of a computer system that may be used to manage database work requests in accordance with certain embodiments of the invention.

FIG. 2 illustrates one embodiment of a computer system 200, which may be exemplary of any of the computers described above. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other computer described above with respect to the system 100.

The computer system 200 may also comprise software elements, shown as being currently located within a working memory 240, including an operating system 245 and/or other code 250, such as an application program (which may be a client application, web browser, mid-tier application, RDBMS, etc.). The application programs may have and/or designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3A:
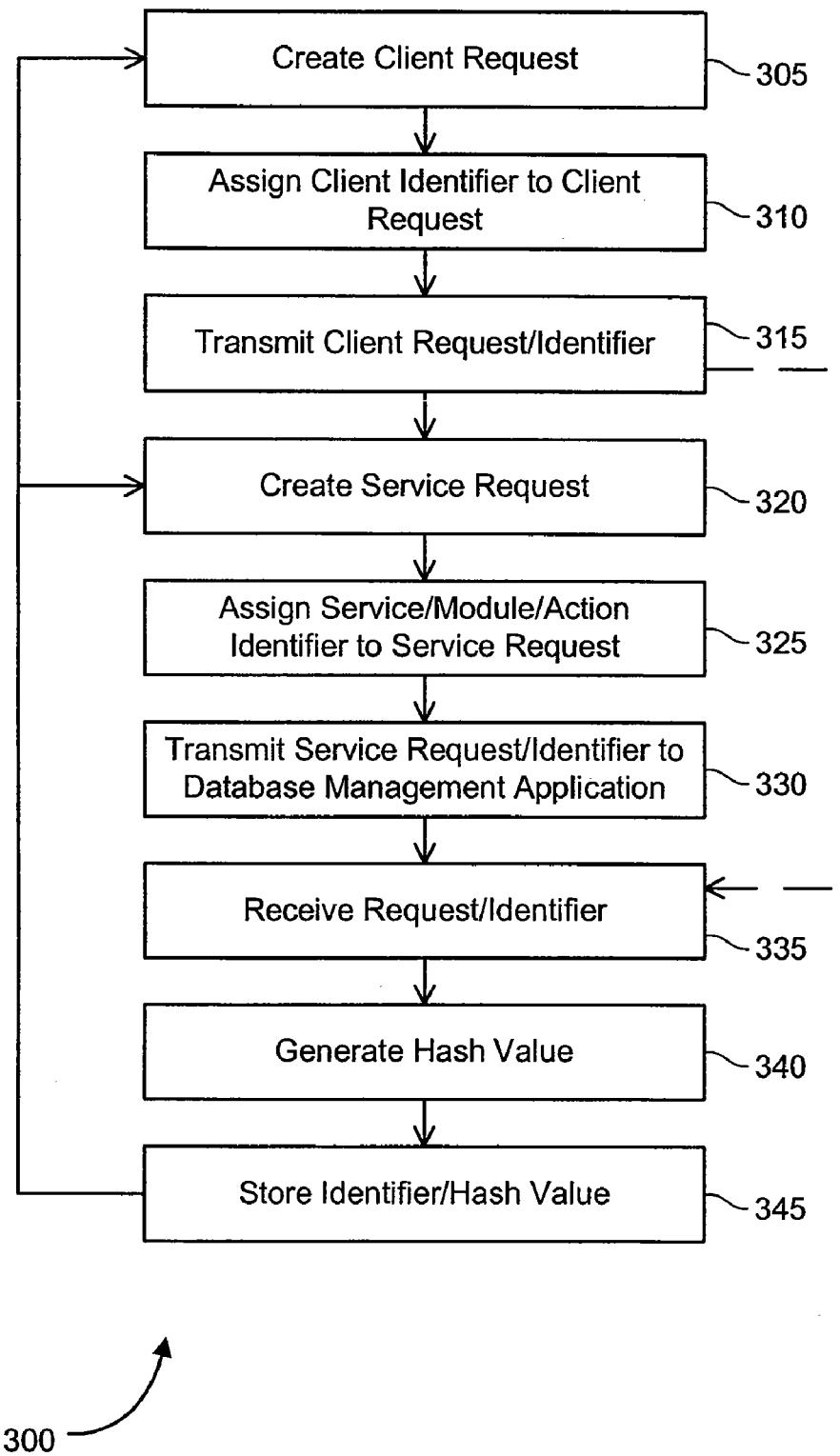
FIGS. 3A and 3B are flow diagrams illustrating a method of managing database work requests in accordance with certain embodiments of the invention.

As noted above, another set of embodiments includes methods of managing work requests. FIG. 3A is a process flow diagram illustrating a method 300 of identifying a database work request, in accordance with various embodiments of the invention. It should be appreciated that in some case the method 300 may be performed iteratively and/or in parallel for a plurality work requests. In such cases, some steps in the method 300 may be performed individually for each node to be added/modified, while other steps may be performed collectively for all nodes to be added/modified. Moreover, while some or all of the procedures described with respect to this method 300 may be performed by a software application, such as a client application, mid-tier application and/or RDBMS, embodiments of the invention are not limited to any particular functional or architectural implementation.

In accordance with various embodiments, the method may include creating a work request (block 305). In some embodiments, the work request may be a client work request—that is, the work request may be created by a client. As noted above, a client may be a web browser, dedicated client, etc. The work request, therefore, may use a service provided by a mid-tier application, which in turn may be demarcated into modules and/or actions (as is known in the art) and/or or request a transaction directly for a database/RDBMS (e.g., a SQL command). Those skilled in the art will appreciate, based on the disclosure herein, that a client work request can be any of a variety of actions and/or requests.

An identifier (which may comprise and/or be incorporated in an identification handle) may then be assigned to the client work request (block 310). In particular embodiments, as described above, the identifier may include information about a client (such as, merely by way of example, information about the client application and/or the computer on which the client application is running), information corresponding to a cookie associated with the client (particularly, but not only, in cases in which the client is a web browser), and/or information about an end user operating the client (such as a userid, etc.). An identifier (including, e.g., a client identifier) may be any data structure sufficient to convey the necessary identifying information. Merely by way of example, in accordance with some embodiments, an identifier may be a 64-byte string of printable characters, which may contain a userid. Optionally, a client identifier may include other information, such as a hostname associated with the client, etc. Merely by way of example, the client identifier may be formatted as USERID-.HOSTNAME, or using any other acceptable scheme.

The client identifier may be derivable (through a specified algorithm, for example) from a userid. In some cases (such as where the user logs on anonymously to a mid-tier application and/or an RDBMS), the client identifier may be transient (such as for example, a session cookie known in the art). In other cases, the client identifier may be relatively more persistent (such as when the user logs on and is authenticated with a registered userid), in which case a relatively more permanent cookie may be used (e.g., as a cookie that is configured to consist for a set period of time, such as a year, until the user logs out of the system, and/or until the user/client remains dormant—i.e., makes no work requests—for a specified period of time) in a web browser-based client, and/or a client identifier may be stored in a dedicated client application.

In some cases, the client may be configured to assign the client identifier to the work request. In other cases, another entity (such as a mid-tier application and/or a database/RDBMS) may assign the client identifier to the work request. Merely by way of example, if a mid-tier application receives a work request, it may identify the client and/or end-user making the request (e.g., through a cookie on a web browser, etc.) and may thus assign an identifier, based on the identification of the client/end user, to the work request. Those skilled in the art will appreciate, based on the disclosure herein, that in a multi-tiered architecture, the mid-tier application will often be aware of some identification for each client/end user (since, for example, in many cases, an end user and/or client must authenticate with the mid-tier application before any requests may be processed).

At block 315, the client request and/or the assigned identifier may be transmitted. In some cases (e.g., multi-tier architectures, especially where the work request relates to an action in a mid-tier application), the request and/or identifier may be transmitted to a mid-tier application. In other cases, the request and/or identifier may be transmitted directly to a database/RDBMS. In accordance with some embodiments, the identifier may be incorporated within and/or otherwise associated with the work request, either at the client level, the mid-tier level and/or the database level. Merely by way of example, a client may transmit a work request to a mid-tier application, and the mid-tier application may receive that request, examine a cookie on the client, and add information from the cookie to the request. Alternatively, and/or in addition, a client application (and/or a client-side script, in the case of a web browser client) may add the information to the request before transmission.

In cases in which the client request is transferred to a mid-tier application, the mid-tier application may need to engage in a transaction with a database/RDBMS in order to satisfy the client request. In such cases, the mid-tier application may create another work request for the RDBMS/database and/or pass the client request to the RDBMS/database. Optionally, the mid-tier application may modify (and/or add information to) the client request in order that the request may be processed by the RDBMS/database. The mid-tier application, therefore, may create its own work request for the RDBMS/database, referred to herein as a "service request" (block 320). Based on the above disclosure, one skilled in the art will understand that the service request may simply comprise the client request (perhaps with some packaging information and/or other information added to the request), and/or the service request may be derivative of the client request. In other embodiments, the service request may have nothing to do with any particular client request, but may instead be generated by a mid-tier application itself (e.g., as part of an automated process, such as a maintenance process, update process, etc.). In still other embodiments, a single client request may result in the generation of multiple service requests (if, for example, a single client request—such as entering a new order for a customer—results in the need for multiple database transactions) and/or a plurality of client requests may result in the generation of a single service request.

In some cases, another identification handle may be generated, comprising further information about the service request. (Alternatively, there may not be a client identification handle, and this may be the only identification handle for the service request.) The additional information/identification handle may be assigned to the service requests (block 325), by the mid-tier application, by the RDBMS, and/or by another entity. In some cases, as noted above, a mid-tier application may comprise one or more services, which each may comprise one or more modules and/or actions. In some cases, the additional identification handle can include an identifier of the service, module and/or action to which the service request pertains. Merely by way of example, if a client request may comprise a request to add an address to a new client record in a mid-tier application. This client request may relate to a "entering new customer information" action in a "customer information" module of a "customer tracking" service.

The information to be assigned to the service request) may comprise information about the service, module and/or action to which the client request (and, therefore, the service request) relates. In accordance with some embodiments, it may be sufficient to simply identify the service (along with, perhaps a client identifier); further, in some cases, a mid-tier application may not provide any information about its internal processes other than the service name—in such cases, the identifier assigned to the service request may simply be the service name (and/or an identifier corresponding to the service name). In particular embodiments, each service may have a globally-unique name and priority. In such cases, a unique hash value associated with the service name can provide for a relatively quick look-up for the service.

In accordance with other embodiments, more information may be included in an identifier assigned to a service request. Such information, as noted above, can include information about a module and/or an action. In some cases, the service/module/action identifiers can be arranged hierarchically (since, as noted above, each action is usually part of a specific module, and each module is part of a specific service). At block 330, then, the service request and/or an assigned identification handle may be transmitted to a database/RDBMS. In some cases, as noted above, the identification handle may be part of the service request, while in other cases, the identification may be transmitted separately (and, optionally, correlated with the service request).

The work request (which may be a client request and/or a service request, which can optionally include a client identifier) may then be received by the database/RDBMS (block 335). In some cases, the identification handle(s) assigned to the request will be received as well. Merely by way of example, in some cases, as noted above, the work request may comprise the identification handle. In such cases, the RDBMS may parse the request to ascertain the identification handle. In other cases, the identification handle may be transmitted and/or received separately by the RDBMS.

In accordance with some embodiments, a hash value may be generated for the identification handle (block 340) and/or hash values may be generated for each part of the identification handle (e.g., client identifier, service identifier, etc.). Although not every embodiment includes the generation of hash value(s), skilled in the art will appreciate that generating a hash value for a set of data provides a relatively secure and/or relatively efficient means for interpreting, analyzing, and/or storing the data. Many methods of generating a hash value are known in the art, and any appropriate method may be used, in accordance with various embodiments of the invention. In some embodiments, one or more of the hash values may be generated by the mid-tier application and/or database server (e.g., via a server hash function).

The RDBMS/database may then store the identification handle (and/or the hash value(s), if appropriate) (block 345) and/or use the identification handle to locate and/or measure a work request (and/or set of work requests). In particular embodiments, the handle/hash value(s) may be stored in the database to which the work request relates, and/or, more particularly in the workload of the database. Merely by way of example, the database may include a table for storing such information, and/or the information may be stored as metadata in the database. In other embodiments, the information may be stored in a separate file (which may be a database, a flat file, an XML file, etc.). Based on the disclosure herein, those skilled in the art will appreciate that a wide variety of procedures may be used for storing such information. In accordance with particular embodiments, a record of the work request may be stored along with (and/or otherwise associated with) the stored identification handle. Hence, the stored hash value, identification handle and/or work request record may be used for a variety of performance monitoring, tracing, troubleshooting, and/or other purposes, as described in further detail below. In particular embodiments, storage of the identification handle may be transient, such that a new identification handle is generated for each session, work request, etc.

In accordance with various embodiments, the method 300 (and/or various components thereof) may be repeated as necessary for a plurality of work requests, which may each have an identical identification handle assigned (e.g., if each of the plurality of work requests are from the same client and/or relate to the same service, module and/or action). Thus, the method 300 provides a way of identifying work requests for a database.

Figure 3B:
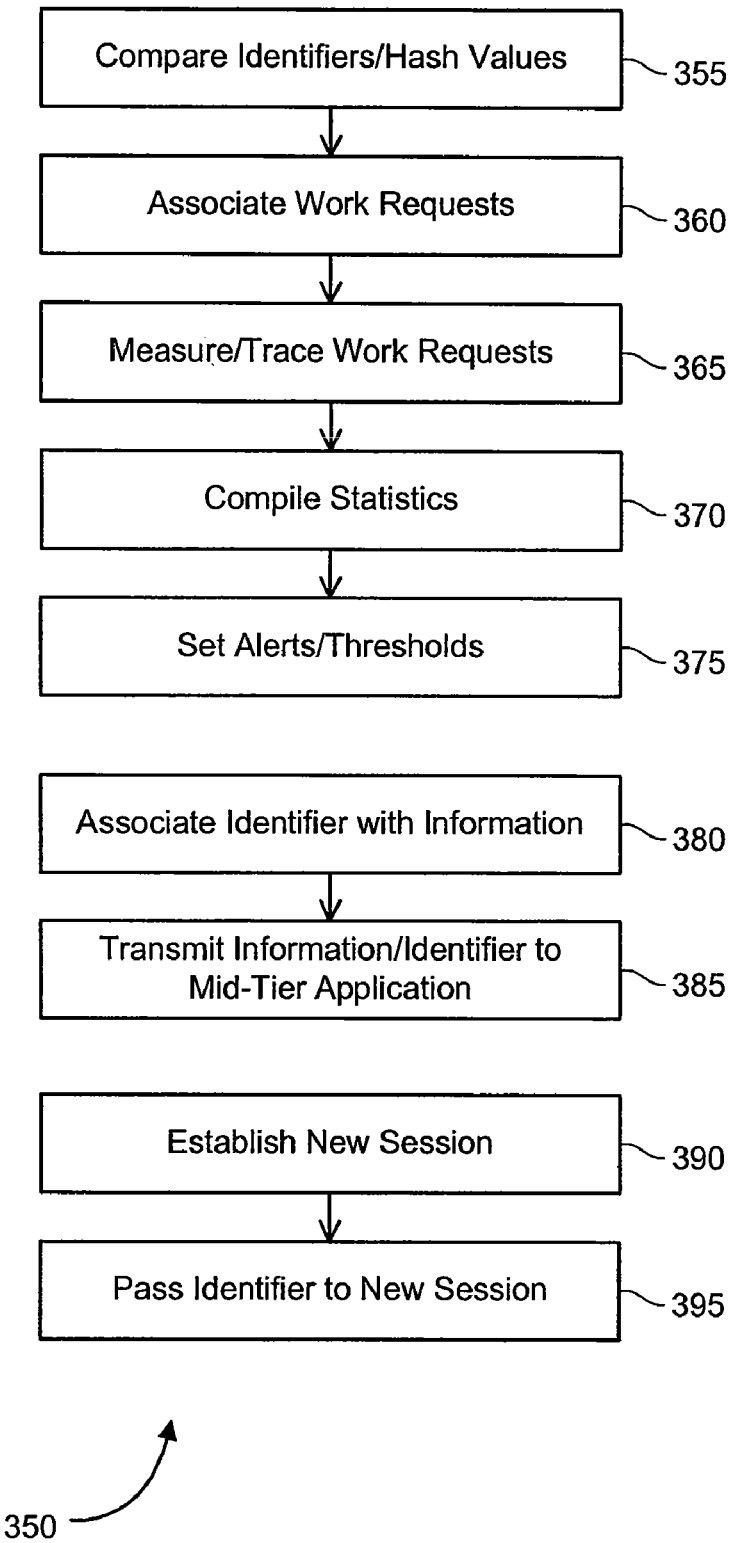

Turning now to FIG. 3B, an exemplary method 350 illustrates some of the various ways in which an identification handle may be used to manage work requests in a database/RDBMS. Merely by way of example, if a plurality of work requests have been submitted to a database, the identification handles (and/or hash values corresponding to those identification handles) may be compared (block 355), and/or any work requests with matching identification handles may be associated with one another (block 360). The procedure for determining whether any identification handles (and/or their corresponding hash values) are matching may depend on the embodiment and/or the purpose for which the identification handles are compared. For instance, it may be desirable in some cases to find all requests submitted by a particular client and/or end user, regardless of any mid-tier service to which those work requests pertain. In such cases, identification handles may be considered matching if they comprise the same client identifier, irrespective of whether any additional information in the respective identification handles is consistent. In other cases (for resource management purposes, for example), an administrator may wish to determine how many service requests were issued by a particular service (and/or by a particular service/module/action combination), and handles may be compared to find all requests issued by the service (and/or service/module/action) of interest, regardless of client. In still other cases, one might wish to analyze a particular "session" for a given user, in which case, both the client identification handle and the service/module/action identification handle may need to be identical for the handles to be considered matching. Based on the disclosure herein, those skilled in the art will appreciate that a variety of criteria may be used to determine whether any identification handles match one another. Optionally, a report may be generated listing all requests for a given identification handle and/or set of matching handles. Merely by way of example, in managing service levels, all work requests for that service may be tracked.

In accordance with some embodiments, a set of work requests, database transactions and/or calls may be measured (block 365). Those skilled in the art are well familiar with the concept of measuring work (transactions, etc.) in a traditional client-server session, and the details of various measuring procedures need not be discussed here in detail.

Various embodiments of the invention provide much more robust measurement functionality, however. Merely by way of example, various measurement operations that are possible include, without limitation statistics gathering and/or aggregation, metrics calculation, and work request tracing (e.g., for debugging purposes, for identifying performance bottlenecks, etc.). The ability of various embodiments to identify work requests, e.g., as described above, may allow for the measurement of database (and/or mid-tier) activity using a much wider variety of criteria than the traditional client/server session model. Merely by way of example, all activity relating to a particular client, service and/or service/module/action may be measured, e.g., using identification handles to determine which work requests to measure. Further, in clustered systems, measurement may be performed, regardless of the instance and/or node on which each request processed. Alternatively, measurement may be limited to a particular node/instance. If desired, a record of the measurement operation may be stored in the database and/or in a separate file, output to a console, printed, etc.

In some cases, it may useful to collect and/or aggregate database and/or mid-tier statistics (block 370). As with measurement, those skilled in the art are familiar with the concept of collecting statistics for a given client-server session. Also similar to tracing, however, embodiments of the invention provide a much more robust environment for gathering statistics. For instance, embodiments of the invention (e.g., using identification handles) may collect statistics according to client, service, service/module/action combination, node, instance, etc. Further, statistics may be collected for any combination of such criteria. A wide variety of statistics may be collected in this manner. Merely by way of example, data could be collected about the number of transactions processed and/or database blocks read, etc. Further embodiments allow alerts and/or thresholds to be set, according to various parameters that may be correlated with any information in an identification handle (block 375). Merely by way of example, a particular service and/or service/module/action may have a resource threshold, such that if the work requests for that service (and/or service/module/action) consume more than a threshold level of resources (e.g., memory, processor cycles, I/O, etc.), an alert may be generated and/or transmitted to an administrator. Alternatively (and/or in addition), further work requests from, the service (and/or service/module/action) may be rejected by the database/RDBMS while the service (and/or service/module/action). The concept of database resource management (including thresholds and alerts) is well-known; embodiments of the invention, however, allow this concept to be implemented with respect to particular clients, services, etc. (in fact, for any group of work that may be identified using an identification handle).

Various embodiments of the invention may also provide a more robust facility for communication between a database/RDBMS and a mid-tier application (and/or client). For example, in accordance with some embodiments, a set of information relating to a work request (and/or a group of related work requests) may be associated with an identification handle for those request(s) (block 380) and/or the information (perhaps along with the identification handle) may be transmitted to the entity responsible for the requests (which may be a client, mid-tier application, etc.) (block 385). Merely by way of example, if an RDBMS allocates a particular set of work requests to a particular node/instance, the RDBMS may inform the mid-tier application (and/or service) responsible for the requests that all future requests related to the same identification handle should be transmitted directly to that node/instance. In this way, for example, the concept of an identification handle can provide for load-balancing functionality and/or efficiency (e.g., load balancing based on service measurements, which can be used to ensure various levels of service quality, etc.), since the RDBMS may not have to become involved in the allocation of future work requests to the proper node/instance. Those skilled in the art will appreciate, based on the disclosure herein, that a wide variety of database information may be transmitted to a mid-tier application (and/or a client) in similar ways, providing features and performance previously unavailable.

In addition, the concept of providing identification handles related to work requests can allow for enhanced internal management of database functions. Merely by way of example, those skilled in the art will appreciate that modern RDBMS systems often spawn new jobs and/or sessions to process a particular batch of work. In some cases, for instance, a particular database job and/or session may spawn a "child" job/session to perform transactions related to the same batch of work. The original job/session and the spawned job/session thus may have a hierarchical relationship, in that the original job/session controls the performance of the new job/session. In other embodiments, a spawned job/session may run in parallel with the original job/session, such that the original job/session does not control the spawned job/session. For instance, for a large job, a parallel process may be spawned in order to allow for better performance in completing the job. In some embodiments (including, inter alia, in clustered environments), the spawned job/session may be performed in a different node/instance of the database, allowing for additional performance enhancements. In further embodiments, a job/session may simply be transferred to a new node/instance, e.g., for load balancing, if the original node/instance becomes unavailable, etc.

As another example, those skilled in the art will also appreciate that RDBMS applications often have server-side work processes (e.g., scheduled processes, maintenance processes, batch processes, etc.) many of which often can spawn child processes. An identification handle may be used with such server-side work as well, and the identification handle(s) (which, as indicated above, may be inherited by child processes) can be used to measure such work, collect statistics, etc.

Thus, in any of these cases, a new job/session may be established (block 390), and the identification handle(s) for a particular set of work requests may be passed to (and/or inherited by) the new job/session (block 395), perhaps along with records of the work requests themselves, providing the new job/session with all necessary information that was available to the original job/session. As but one example, an identification handle may be "inherited" by one or more "child" processes, which can allow measurement, statistics aggregation, etc.

Figure 4:
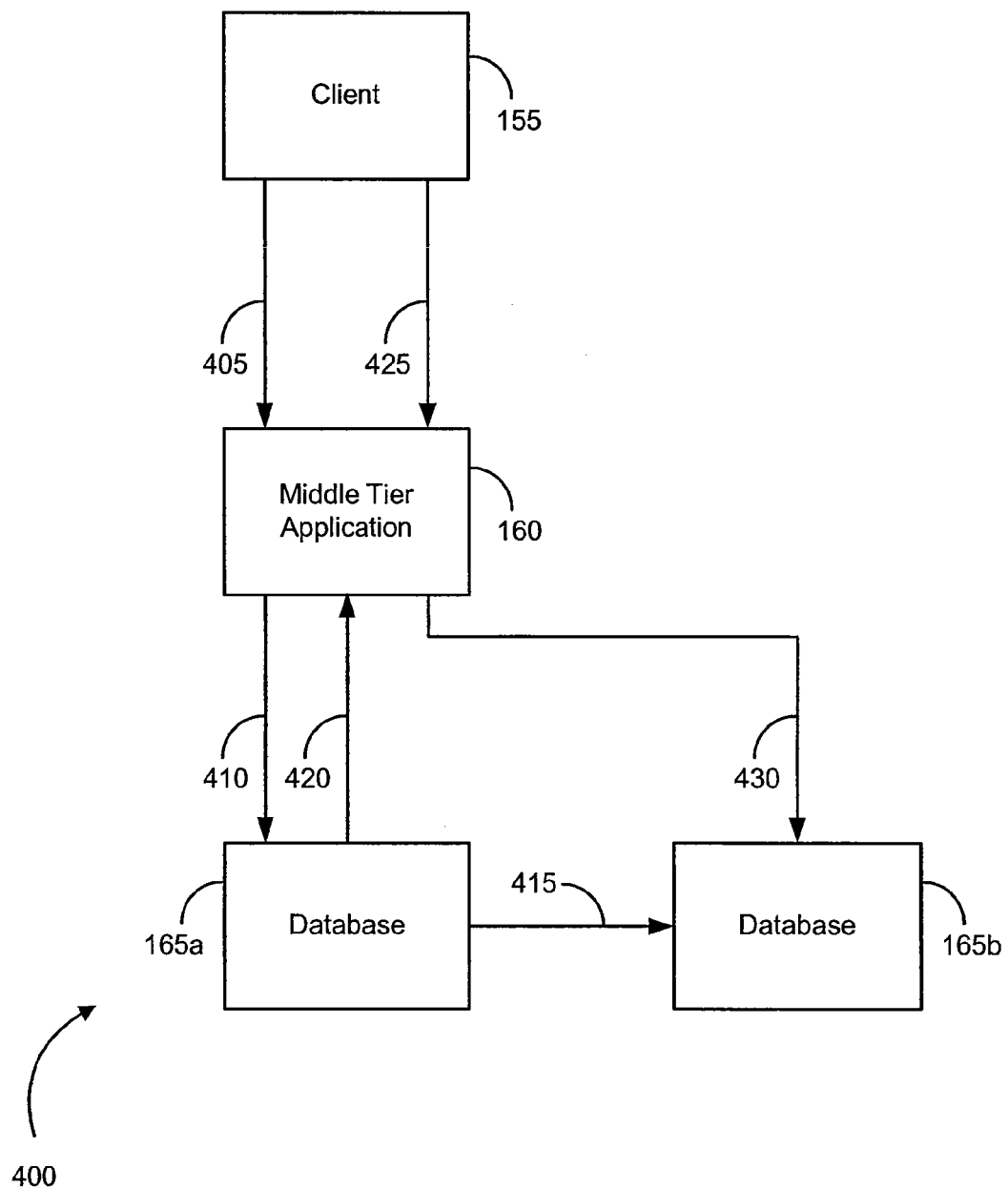
FIG. 4 is a block diagram illustrating a relationship and transactions between a client, a mid-tier application and a database, in accordance with certain embodiments of the invention.

To illustrate one exemplary way in which identification handles may assist in the identification and/or management of work requests, FIG. 4 illustrates an exemplary interaction 400 between a client 155, a mid-tier application 160 and a database 165 (which may be a node/instance of a database and/or an RDBMS, as described in detail above). The client 155 may transmit a client work request 405 to the mid-tier application 160. The mid-tier application 160 may assign an identification handle to the client work request 405; the identification handle may comprise a client and/or end-user identifier. (Alternatively, the client may assign the identification handle to the work request 405).

In the illustrated example, the client work request 405 requires an interaction between the mid-tier application 160 and the database 165, so the mid-tier application prepares a service request 410 and transmits that service request 410 to the database 165a. The service request 410 may also have an assigned identification handle (which may be assigned by the database 165a and/or the mid-tier application 160). Thus, there may be an identification handle comprising the client identifier (from above) and/or an identification handle comprising a service identifier and/or a service/module/action identifier. (Alternatively, all of this information could be combined into a single identification handle.) The database 165a may process the service request 405.

In addition, in the illustrated example, the database (or, more probably, an RDBMS managing the database) determines that further work requests related to the identification handle(s) should be processed at another database 165b (which might be simply a different node/instance of the same database). The identification handle and/or information about the work request (collectively referenced by numeral 415) may be transmitted to the other database 165b, and/or a notification 420 may be transmitted to the mid-tier application (and/or a service, module and/or action thereof); the notification might indicate that future work requests related to the service request 410 should be transmitted to the other database 165b.

In some cases, the notification might include the identification handle(s), so that the mid-tier application (and/or service, module and/or action thereof) can identify the work request to which the notification relates. The following commonly-assigned, co-pending applications, of which the entire disclosures of each are incorporated herein by reference for all purposes, describes various ways in which notification can be performed, and identification handles may be incorporated into the methods and/or systems described therein: U.S. application Ser. No. 10/917,663, entitled "Fast Reorganization of Connections in Response To an Event in a Clustered Computing System" and filed Aug. 12, 2004 by Colrain et al.; and U.S. application Ser. No. 10/917,660, entitled "Fast Application Notification in a Clustered Computing System" and filed Aug. 12, 2004 by Colrain. In particular cases, the notification may need to use only a part of an identification handle (e.g., a database identifier, node name identifier, etc.), while in other cases, different parts (or the entirety) of the identification handle may be used.

Thereafter, the client 405 might submit an one or more additional work requests (e.g., 425) to the mid-tier application. In the illustrated example, the additional work requests are related to the original request 405 (e.g., they pertain to the same service, module and/or action as the original request 405). Based on the disclosure herein, those skilled in the art will recognize that these additional work requests will have an identification handle that matches (at least in some respect) the identification handle assigned to the original work request. (e.g., database unique name, instance name and/or node name). Assuming, for purposes of this example, that at least one of the new client requests (e.g., 425) again requires the mid-tier application 160 to interact with the database 165, the mid-tier application 160 will prepare another service request 430. The mid-tier application 160, recognizing that the identification handle(s) assigned to the new work requests (e.g., 425) matches the identification handle(s) assigned to the original work request 405, thus might automatically submit the new service request 430 to the other database 165b, in accordance with the instructions relating to the original identification handle(s). As can be seen from this example, identification handles may be used for load balancing (e.g., between databases—or instances—165a, 165b).

In another example, the service (and/or the mid-tier application) associated with the service request 430 might have exceeded a resource utilization threshold for the database 165. In this example, recognizing that the identification handle identifies the request 430 as being from the offending service/application, the database 165 (and/or an RDBMS managing the database 165) might reject the work request 430 and/or give it a lower resource priority.

In yet another example, the client 155 (and/or an end user operating the client) might complain to an administrator that performance seems unusually low. In this example, the administrator might measure and/or trace all work requests made to the database 165 that have an assigned identification handle matching the client identifier for that client (and/or an identification handle matching the service and/or service/ module/action the end user is attempting to use). Such a measurement would include work requests 410 and 430. (In accordance with certain embodiments, traces may be performed and/or statistics may be collected across a plurality of nodes/instances (e.g., 165a, 165b), using the identification handle (and/or a component thereof) as the criteria for the measurement. Of course, such operations may be limited to a particular instance/node if desired).

In addition, metrics might be collected (perhaps based on this measurement), and/or such metrics might be used to determine and/or adjust quality-of-service levels (e.g., for a service, module, and/or action). In this way, for example, the measurement of database work (e.g., using identification handles) can allow/facilitate the implementation of established service levels and quality-of-service considerations. Merely by way of example, commonly-assigned, co-pending U.S. application Ser. No. 10/917,715, entitled "Measuring Work Load By Service" and filed Aug. 12, 2004 by Colrain et al., the entire disclosure of which is incorporated herein by reference for all purposes, describes various strategies and methodologies of establishing and/or maintaining service levels and quality-of-service for various services, etc., and any of these techniques may implement identification handles as appropriate.

Those skilled in the art will appreciate, based on these example and the remainder of this document, that many other features may be implemented/facilitated by the use of identification handles as well.

Thus, in addition to merely identifying one or more work requests, embodiments of the invention can also provide novel ways for an RDBMS and/or mid-tier application to manage work requests. Although several examples of such management features have been described above, those skilled in the art will appreciate, based on the disclosure herein, that embodiments and features of the present invention can allow for a wide variety of management functions heretofore unavailable in modern database systems.

Similarly, in the foregoing description, for the purposes of illustration, various methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Merely by way of example, some embodiments of the invention provide software programs, which may be executed on one or more computers, for performing the methods described above. Alternatively, the methods may be performed by a combination of hardware and software.

Hence, various embodiments of the invention provide inventive methods, systems and software products for managing database work requests. The description above identifies certain exemplary embodiments for implementing the invention, but those skilled in the art will recognize that many modifications and variations are possible within the scope of the invention. The invention, therefore, is defined only by the claims set forth below.

What is claimed is:

1. A method of identifying a database work request, the method comprising:
   assigning a first identification handle to a first database work request, wherein the first identification handle comprises a first identifier that identifies an entity that created the first database work request;
   receiving at a database management application the first work request together with the first identification handle assigned to the work request, wherein the database management application manages a database to which the work request corresponds; and
   generating a first hash value associated with the identification handle assigned to the work request;
   receiving at a database management application a second database work request together with a second identification handle assigned to the second database work request, wherein the second identification handle comprises a second identifier;
   generating a second hash value associated with the second identification handle and corresponding to the second identifier;
   comparing the second hash value with the first hash value;
   associating the second database work request with the first database work request, based on a comparison of the second hash value with the first hash value;
   associating a plurality of database work requests based on identification handles assigned to each of the plurality of database work requests, wherein the plurality of database work requests comprises the first database work request and the second database work request;
   taking one or more actions based on the associated first database work request and the associated second database work request, wherein taking one or more actions comprises:
      collecting an aggregate statistic for the plurality of database work requests;
      calculating a metric for the plurality of database work requests; and
   using the calculated metric to control a quality-of-service for the plurality of database work requests.

2. A method of identifying a database work request as recited in claim 1, the method further comprising using the hash value to identify the database work request.

3. A method of identifying a database work request as recited in claim 1, wherein the identification handle comprises a plurality of identifiers, wherein generating at least one hash value comprises generating a plurality of hash values, and wherein each of the hash values is associated with one of the plurality of identifiers.

4. A method of identifying a database work request as recited in claim 3, wherein the plurality of identifiers comprises at least two identifiers selected from the group consisting of a client identifier, a service identifier, a service/module/action identifier, a unique database name, a cluster node name and an instance name.

5. A method of identifying a database work request as recited in claim 1, wherein the entity associated with the database work request is a database client application.

6. A method of identifying a database work request as recited in claim 1, wherein the entity associated with the database work request is a web browser.

7. A method of identifying a database work request as recited in claim 6, wherein the identification handle corresponds to a cookie stored by the web browser.

8. A method of identifying a database work request as recited in claim 1, wherein the entity associated with the database work request is a mid-tier application.

9. A method of identifying a database work request as recited in claim 1, wherein the entity associated with the database work request is a database service.

10. A method of identifying a database work request as recited in claim 1, wherein the entity associated with the database work request is combination of a database service, a database module and a database action.

11. A method of identifying a database work request as recited in claim 1, wherein the identification handle comprises a client identifier.

12. A method of identifying a database work request as recited in claim 1, wherein the identification handle comprises a username for a mid-tier application.

13. A method of identifying a database work request as recited in claim 1, wherein the identification handle comprises a value selected from a group consisting of a unique name of the database to which the work request corresponds, an instance name for an instance of the database to which the work request corresponds, and a node name for a clustered node on which the database to which the work request corresponds resides.

14. A method of identifying a database work request as recited in claim 1, wherein the identification handle comprises a service identifier.

15. A method of identifying a database work request as recited in claim 1, wherein the identification handle comprises a service identifier, a module identifier, and an action identifier.

16. A method of identifying a database work request as recited in claim 1, wherein storing the hash value associated with the identification handle comprises storing the hash value in the database to which the work request corresponds.

17. A method of identifying a database work request as recited in claim 1, wherein the identification handle is configured to persist throughout the life of a database call associated with the work request.

18. A method of identifying a database work request as recited in claim 1, wherein the identification handle is configured to persist throughout the life of a database session associated with the work request.

19. A method of identifying a database work request as recited in claim 1, the method further comprising:
measuring work for a database session, wherein the database session comprises the first work request and the second work request.

20. A method of identifying a database work request as recited in claim 1, wherein the work request is associated with a first database session, the method further comprising:
establishing a second database session; and
passing the identification handle from the first database session to the second database session.

21. A method of identifying a database work request as recited in claim 20, wherein the first database session and the second database session are parallel database sessions.

22. A method of identifying a database work request as recited in claim 20, wherein the first database session and the second database session have a hierarchical relationship.

23. A method of identifying a database work request as recited in claim 1, wherein the work request is initiated by a mid-tier application, and wherein the method further comprises:
associating the identification handle with a set of information; and
transmitting the set of information, together with the identification handle, from the database for reception by the mid-tier application.

24. A method of identifying a database work request as recited in claim 23, wherein the set of information pertains to a quality-of-service related to the database work request.

25. A method of identifying a database work request as recited in claim 23, wherein the set of information pertains to an availability of a database server associated with the database work request.

26. A method of identifying a database work request as recited in claim 23, wherein the identification handle comprises an identifier corresponding to a database name, the method further comprising:
the mid-tier application identifying, with the identifier, the database to which the work request corresponds.

27. The method of claim 1, wherein taking an action comprises:
measuring work for a database session, wherein the database session comprises the first work request and the second work request; and
outputting a record of a measurement of the work for the database session.

28. The method of claim 27, wherein outputting a record of the measurement of the work for the database session comprises an operation selected from the group consisting of storing the measurement in the database, storing the measurement in a separate file, displaying the measurement for a user, and printing the measurement.

29. The method of claim 1, wherein taking one or more actions comprises tracing the first database work request and the second database work request.

30. A computer system for identifying a database work request, the computer system comprising:
a first computer, comprising:
a processor; and
a computer readable medium, the computer readable medium comprising instructions executable by the processor to:
assign a first identification handle to a first database work request, wherein the first identification handle comprises an identifier that identifies an entity that created the first database work request; and assign a second identification handle to a second database work request, wherein the second identification handle comprises a second identifier; and
a second computer, comprising:
a second processor; and
a second computer readable medium in communication with the second processor, the second computer readable medium comprising a database management application executable by the processor, a database managed by the database management application, and instructions executable by the second processor to:
receive at the database management application the first work request together with the first identification handle assigned to the first work request, wherein the first work request corresponds to the database managed by the database management application;
generate a first hash value associated with the first identification handle assigned to the first work request;
receive at the database management application the second work request together with the second identification handle assigned to the second work request;
generate a second hash value associated with the second identification handle and corresponding to the second identifier;
compare the second hash value with the first hash value;
associate the second database work request with the first database work request, based on a comparison of the second hash value with the first hash value;
associate a plurality of database work requests based on identification handles assigned to each of the plurality of database work requests, wherein the plurality of database work requests comprises the first database work request and the second database work request;
take one or more actions based on the associated first database work request and the associated second database work request, wherein taking one or more actions comprises:
collecting an aggregate statistic for the plurality of database work requests;
calculating a metric for the plurality of database work requests; and
using the calculated metric to control a quality-of-service for the plurality of database work requests.

31. A computer system for identifying a database work request as recited in claim 30, wherein the first computer is a client computer.

32. A computer system for identifying a database work request as recited in claim 31, wherein the first computer comprises a web browser configured to serve as a database client.

33. A computer system for identifying a database work request as recited in claim 31, wherein the first computer comprises a client application configured to interact with the database.

34. A computer system for identifying a database work request as recited in claim 31, the computer system further comprising:
a third computer comprising a mid-tier application configured to interact with the database.

35. A computer program stored on a computer-readable storage medium for identifying a database work request, the computer program comprising instructions executable by a computer to:
receive at a database management application a first work request together with a first identification handle assigned to the first work request, wherein the first work request corresponds to a database managed by the database management application, and wherein the first identification handle comprises an identifier that identifies an entity that created the first database work request;
generate a hash value associated with the identification handle assigned to the work request;
receive at the database management application a second database work request together with a second identification handle assigned to the second database work request, wherein the second identification handle comprises a second identifier;
generate a second hash value associated with the second identification handle and corresponding to the second identifier;
compare the second hash value with the first hash value;
associate the second database work request with the first database work request, based on a comparison of the second hash value with the first hash value;
associate a plurality of database work requests based on identification handles assigned to each of the plurality of database work requests, wherein the plurality of database work requests comprises the first database work request and the second database work request;
take one or more actions based on the associated first database work request and the associated second database work request, wherein taking one or more actions comprises:
collecting an aggregate statistic for the plurality of database work requests;
calculating a metric for the plurality of database work requests; and
using the calculated metric to control a quality-of-service for the plurality of database work requests.

36. A computer program as recited in claim 35, wherein the computer program is part of a relational database management application.

37. A computer program as recited in claim 35, wherein the computer program is configured to interoperate with a relational database management application.

* * * * *